J. B. Parker,

Corn Planter.

No. 97,957. Patented Dec. 14, 1869.

Witnesses
F. Lehmann
C. L. Evert

Inventor
Jas. B. Parker
per
Alexander Mason
Atty.

United States Patent Office.

JAMES B. PARKER, OF KNOB NOSTER, MISSOURI.

Letters Patent No. 97,957, dated December 14, 1869.

IMPROVEMENT IN CORN-PLANTERS.

The Schedule referred to in these Letters Patent and making part of the same.

*To all whom it may concern:*

Be it known that I, JAMES B. PARKER, of Knob Noster, in the county of Johnson, and in the State of Missouri, have invented certain new and useful Improvements in Corn-Planters; and do hereby declare that the following is a full, clear, and exact description thereof, reference being had to the accompanying drawings, and to the letters of reference marked thereon, making a part of this specification.

The nature of my invention consists in the construction and general arrangement of a "corn-planter," which can be set so as to drop the corn at any distance apart that may be desired.

In order to enable others skilled in the art to which my invention appertains, to make and use the same, I will now proceed to describe its construction and operation, referring to the annexed drawings, in which—

A A represent the side beams, connected at or near their centre by the cross-beam B.

At this point, on the outside of the side beams, the wheels C C are mounted on suitable axles. The rims of these wheels are concave, and, as the wheels will follow directly after the corn, they will, in a measure, cover it up.

Figure 1:
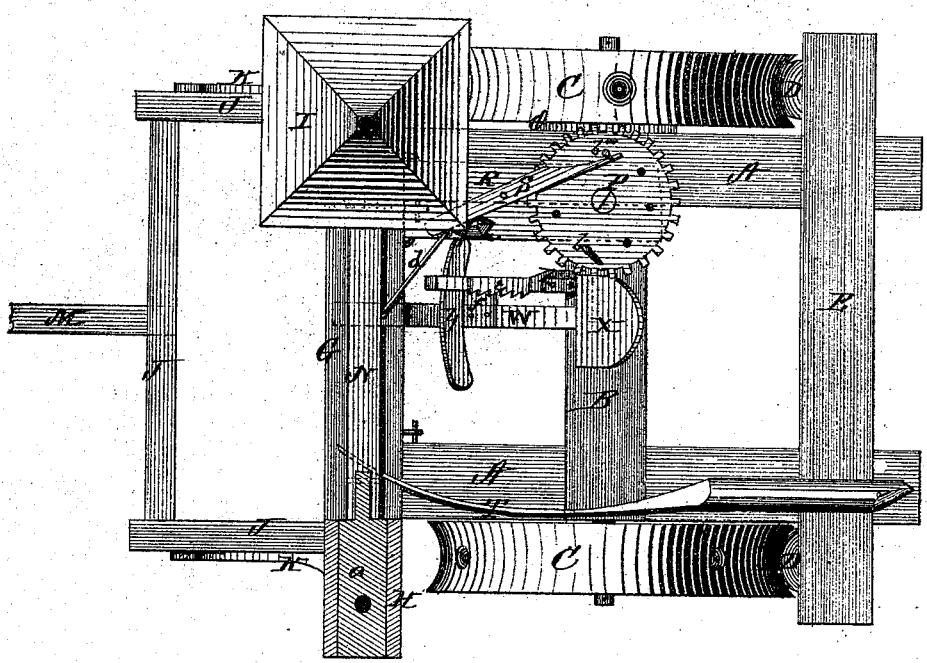
Figure 1 is a plan view of the entire machine.
Figure 2:
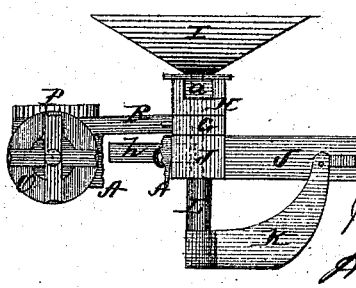
Figure 2 is a side view of a portion of the machine, showing the manner of throwing the dropper in and out of gear.

Any earth that may adhere to the rims is scraped off by the scrapers D D, attached to the rear cross-bar E, which connects the rear ends of the side beams A A, and extends on the sides of the same, as seen in fig. 1.

At the front ends of the side beams A A is secured a cross-bar, G, which extends on each side of the machine, and supports at each end a box, H, on top of which the hopper I is placed.

Under the cross-bar G, and to the side beams A A, is pivoted a frame, J, which, under each side, is provided with a furrow-plow, K, placed directly in front of the wheel.

From the rear end of the plow K, a tube, L, leads upward through the rear bar of the frame J, said tube being directly under a hole in the cross-bar, G, and box H, through which the corn is to be dropped.

To the frame J, the tongue M is attached in any suitable manner.

In the boxes H H are placed plungers *a a*, which are pivoted to a bar, N, one at each end, said bar thus connecting the two plungers, and rests on the front cross-bar G.

The plungers *a* are provided with a hole, for the purpose of conveying a grain of corn from the aperture in the bottom of the hopper to the hole in the box H, and allow the same to fall down into the ground.

The bar N is operated in the following manner:

To one of the wheels, C, on its inner side, is attached a wheel, O, having cogs along the inner side of its rim, which cogs gear with a cog-wheel, P, pivoted on a platform, R, said platform being hinged at its front end to the front cross-bar G, and resting upon one side beam, A, and the cross-bar B. On the upper side of the cog-wheel P is a series of holes, in any or all of which pins *b b* are inserted; and on the platform R is pivoted a lever, S, the rear end of which extends above the cog-wheel P, and is acted upon by the pins *b b*, while the front end of said lever is, by a rod, *d*, connected with the bar N.

When the machine is in motion, and consequently the cog-wheel P revolving, the pins *b b* will turn the lever S, causing the bar N, with the plungers *a a*, to move to one side, carrying each a grain of corn from the hoppers I I to the holes in the bars G, and to the tubes L, from whence it falls into the furrow made by the plow K. As soon as the pin *b* has passed off the end of the lever S, a spring, T, attached in any suitable manner to the frame of the machine, and to the bar N, causes said bar and the plungers *a a* to resume their original position.

The holes in the cog-wheel P are so arranged, that by the insertion of pins, the machine can be regulated to drop corn one, two, three, or four feet apart, or, in fact, any distance apart.

To the rear bar of the frame J is secured an inclined standard, W, which supports the driver's seat X, and is also provided with a foot-board, Y. Then, on the cross-bar B, of the main frame, is pivoted a lever, Z, which is provided with a ratchet-bar, *e*, and inclines forward, crossing the standard W, so that it can catch on a plate, *f*, secured to said standard above the foot-board Y.

By the use of the lever Z, it will be seen that the driver can, at any time, lower the front of the frame J. On the rear bar of said frame a small bar, *h*, is secured, which bar extends toward the rear, directly under the platform R, so that when the front end of the frame J is lowered, as above mentioned, the said bar *h* will raise the rear end of the platform, throwing the cog-wheel P out of gear with the wheel O. By moving the lever Z back again, the wheels will be thrown in gear again.

This machine is designed to plant corn straight both ways, by having a furrow at each side of the field, to show the driver exactly where to drop the first hill. It will save laying off the ground one way, and save the extra hand-dropping over other machines, this machine doing its own dropping.

Having thus fully described my invention,

What I claim as new, and desire to secure by Letters Patent—

1. The arrangement, upon the cross-bar G, of the boxes H H, hoppers I I, plungers $a\ a$, and connecting-bar N, all substantially as and for the purposes herein set forth.

2. In combination with the bar N and plungers $a\ a$, the rod $d$, lever S, pins $b\ b$, cog-wheel P, platform R, cog-wheel O, and spring T, all substantially as and for the purposes herein set forth.

3. The arrangement of the frame J with bar $h$, seat-standard W, and lever Z, all constructed as described, substantially as and for the purposes herein set forth.

4. The combination and arrangement of the main frame A B E G, wheels C C, scrapers D D, frame J, plows K K, boxes H H, hoppers I I, plungers $a\ a$, bar N, cog-wheels O P, lever S, platform R, rod $d$, spring T, seat-standard W, lever Z, and bar $h$, all constructed as described, and operating substantially in the manner and for the purposes herein set forth.

In testimony that I claim the foregoing, I have hereunto set my hand, this 14th day of September, 1869.

JAMES B. PARKER.

Witnesses:
CHAUNCEY COBB,
STEPHEN D. MEHEW.